Sept. 27, 1966   A. A. HOWARD ETAL   3,275,012
SAFETY VALVE SYSTEM FOR FLAMMABLE LIQUIDS AND GASES
Filed April 10, 1963   2 Sheets-Sheet 1
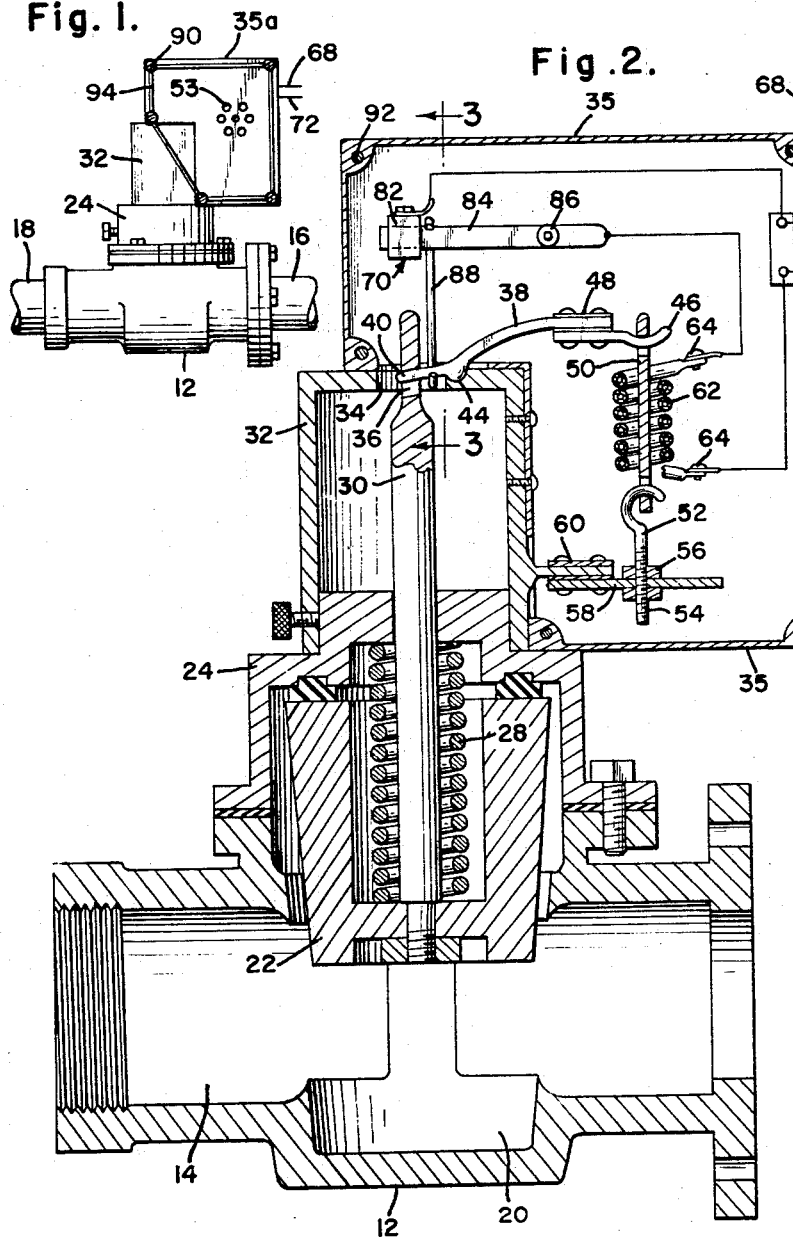
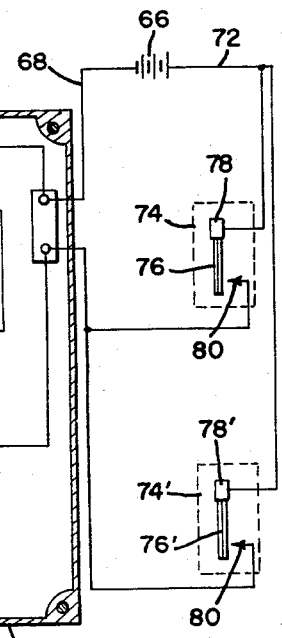
INVENTORS
Augustus A. Howard
George H. Weise
BY
Townsend and Townsend
attorneys

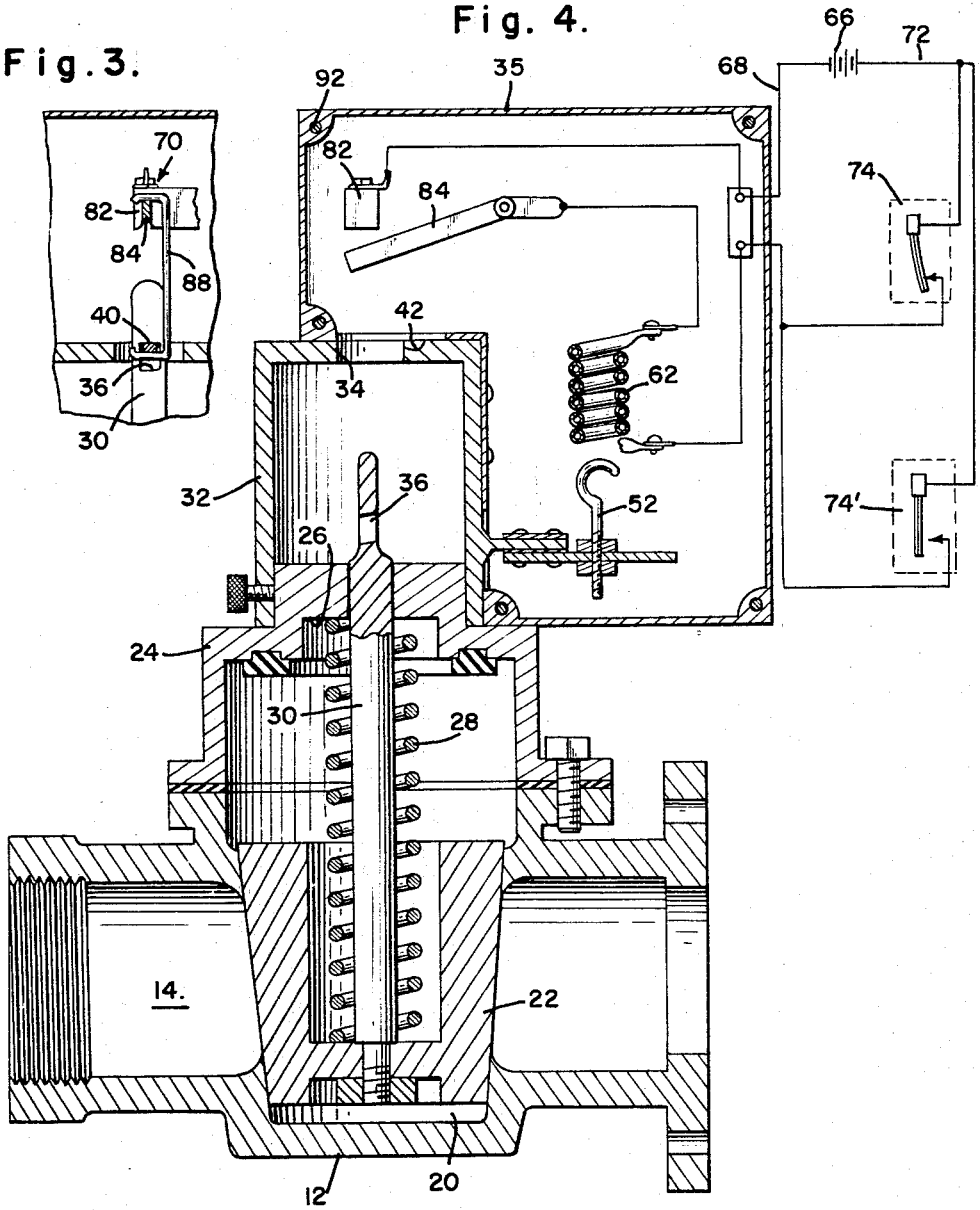

United States Patent Office 3,275,012
Patented Sept. 27, 1966

3,275,012
SAFETY VALVE SYSTEM FOR FLAMMABLE LIQUIDS AND GASES
Augustus A. Howard, 801 Marin Road, El Sobrante, Calif., and George H. Weise, 3121 Ricks Ave., Martinez, Calif.
Filed Apr. 10, 1963, Ser. No. 272,107
8 Claims. (Cl. 137—76)

This invention relates to a valve for arresting the flow of flammable fluid therethrough in response to dangerous fire or other high temperature conditions proximate the system in which the valve is installed.

The interruption of the flow of flammable fluid such as natural gas, propane, diesel fuel, gasoline or the like to equipment using such fluid as fuel is desirable when fires or other dangerous heat conditions arise near the equipment or the fluid line. Such interruption helps to prevent spreading of the fire and explosions.

Therefore, it is an object of this invention to provide a valve that interrupts the flow of fluid therethrough when a high temperature condition is sensed proximate the valve. This object is fulfilled by providing a body defining a conduit for the flammable fluid, a sealing member movable between a fluid flow passing position and a fluid flow arresting position, a spring or the like for biasing the sealing member toward the fluid flow arresting position, a lever arm adapted to secure the sealing member in the fluid flow passing position against the bias of the spring, and a fusible link securing the lever arm in position. When the temperature proximate the fusible link rises above a preselected level, the link fuses and the lever releases the sealing member against the force of the spring so as to move the sealing member to the fluid flow arresting position.

Another object is to provide a flammable fluid safety valve that is extremely sensitive to temperature rises proximate the valve without excessive time delay. This object is attained by providing a lever arm of a length sufficient that a very thin fusible link possesses sufficient strength to secure the lever in the valve-open position. Sensitivity of the fusible link increases as the size of the link decreases.

Still another object is to provide a safety valve which can be closed in response to temperature increases at sites remote from the valve. This object is achieved by providing an electric resistance coil in heat communication with the fusible link, a source of power to energize the coil and a temperature sensitive circuit closing device for placement remote from the valve, which device closes upon sensing a dangerously high temperature condition, thus to energize the heating coil and fuse the link. A plurality of such temperature sensitive circuit closing devices spaced at various sites remote from the valve will effect closure of the valve if a high temperature condition is sensed by any one of the devices.

A further object is to provide a remote temperature sensing system for operating the valve that requires a minimum amount of electric power. Such object is realized by connecting the resistance coil into an electric circuit through a normally closed switch and providing a linkage between the switch and the valve to open the switch and thus interrupt the current when the valve closes.

A still further object is to provide a fluid safety valve and an electrical system for closing the valve from remote sites, which valve and system are protected against unauthorized tampering or by-passing thereof. This object is achieved by providing an enclosure for the link, switch and heating coil, which enclosure can be sealed against unauthorized entry. The enclosure is formed with a heat-pervious portion adjacent the link so that its heat sensitivity is not materially affected by the presence of the enclosure.

These and other objects will be more apparent after referring to the following specification and attached drawings in which:

FIGURE 1 is a side view of the preferred embodiment of our safety valve;

FIGURE 2 is an enlarged side view in cross section of the valve of FIGURE 1 shown in the fluid flow passing position;

FIGURE 3 is a partial cross section view taken along line 3—3 of FIGURE 2; and

FIGURE 4 is a cross section view similar to FIGURE 2 with the valve in the fluid flow arresting position.

Referring more particularly to the drawings, reference numeral 12 indicates a body formed with a fluid conduit 14 therethrough for conveying fluid from an inlet pipe 16 to an outlet pipe 18. Inlet pipe 16 is typically connected to a source of flammable fluid such as natural gas, propane, diesel fuel, gasoline or the like; outlet pipe 18 is typically connected to a boiler, furnace or the like. Body 12 is provided with a seat 20 for receiving a slidable member 22 therein so as to arrest the flow of fluid through conduit 14. Although the valve depicted herein is a cone valve, the invention is not to be considered limited to such valve. Secured to body 12 is a housing 24 adapted to support sealing member 22 for movement into and out of seat 20. Interior of housing 24 is an inwardly extending flange 26 which is adapted to support a compression spring 28 against sealing member 22 to bias the sealing member toward the fluid flow arresting position. Such position is exemplified by FIGURE 4. Secured to sealing member 22 and extending upwardly from compression spring 28 is an operating rod 30. A casing 32 is secured atop housing 24 and is formed with an opening 34 therein through which rod 30 is adapted to extend only when sealing member 22 is in the fluid flow passing position, as exemplified by FIGURE 2. An enclosure 35 is mounted on casing 32 with the interior thereof in communication with opening 34. Rod 30 is formed at the upper end thereof, the end extending into enclosure 35, with an aperture 36 therein. A lever 38 is provided for retaining rod 30 in an upward position and sealing member 22 in a fluid flow passing position; the lever has an end portion 40 extending into aperture 36 to perform this function. Adjacent opening 34 casing 32 is formed to define a depression 42, which depression in conjunction with a complementary protuberance 44 on lever 38 forms a fulcrum for the lever. Lever 38 has a hook-like portion 46 on the end thereof remote from portion 40, hook 46 being electrically insulated from lever 38 by an insulative connection 48. A fusible link 50 is provided for engaging lever 38 at hook-like portion 46 and is secured to casing 32 at is lower end by means of a hook 52. Adjacent link 50 enclosure 35 has a heat-pervious portion formed by a plurality of holes 53 through the enclosure walls.

Hook 52 is provided with a threaded portion 54 adapted to be received in a threaded opening 56 in a bracket 58 which is secured to casing 32 by insulative connection 60. It will be obvious that rotation of hook 52 relative bracket 58 will permit adjustment of the hook so that fusible links 50 of varying lengths can be utilized.

The operation of the above described portion of our invention is as follows. With link 50 in place as shown in FIGURE 2, hook portion 46 of lever 38 is held down as a consequence of which lever end portion 40 supports rod 30 in an upward position. Sealing member 22 is thus retained in a fluid flow passing position. A temperature increase proximate the valve will be sensed by link 50 due to the entry of heat energy through holes 53 in enclosure 35. When the temperature reaches a certain preselected level, for example 160° F., link 50 is adapted to fuse. Upon fusion of the link, hook portion 46 is no longer secured with the result that rod 30 and sealing member 22 are urged downwardly by spring 28. Because lever 38 is not attached to casing 32 at the fulcrum, lever 38 rapidly and positively releases rod 30 when the link fuses. The flow of fluid through conduit 14 is arrested by sealing member 22 engaging seat 20 where it is retained by compression spring 28. When the high temperature condition has been eliminated rod 30 is raised, lever 38 reinserted, and a new fusible link 50 installed between hook portion 46 of the lever and hook 52.

Circumscribing fusible link 50 is an electric resistance heating coil 62 secured by suitable insulated terminals 64. Coil 62 is spaced sufficiently close to link 50 that the link will be fused by the heat produced by the coil when the coil is energized. A suitable power source, exemplified by a battery 66, has one output terminal thereof connected to coil 62 through a conductor 68 and a normally closed switch 70. The other output terminal of power source 66 is connected to coil 62 through a conductor 72 and one or more parallelly interconnected temperature sensitive circuit closing devices 74, 74'. Each of the temperature sensitive devices is adapted to close the circuit upon sensing a preselected temperature; one expedient for this purpose is a bimetallic element 76 fixed at one end by a suitable mount 78 and having a fixed electrical contact 80 adjacent the opposite end thereof. Temperature sensitive devices 74 are adapted to remain in an open circuit condition when ambient temperatures are at a safe level and to complete a circuit when a dangerously high temperature is sensed.

Normally closed switch 70 includes a fixed contact 82 and a movable contact 84 secured at a pivot point 86 remote from the fixed contact. As shown in FIGURE 3, fixed contact 82 is formed in a generally U-shaped configuration so as to secure movable contact 84 in a closed circuit position. Switch 70 is made responsive to movement of the sealing member toward the fluid arresting position by providing an insulative strap 88 extending between movable contact 84 and end portion 40 of lever 38. Strap 88 is formed with hook portions on opposite ends thereof for engaging the movable contact and lever 38.

The operation of our electric temperature sensing system is as follows. With temperature sensitive circuit closing devices spaced at critical points, for example in water tanks and ceiling areas of a building in which a flammable fluid line lies, and the elements connected as described above, the presence of a dangerously high temperature proximate any individual device 74 will act on its bimetallic element 76 to complete a circuit between power source 66 and coil 62. As a result of the consequent current flow through coil 62, the coil and fusible link 50 are heated and the link fuses. Closure of the valve follows in the manner described above. The downward movement of end portion 40 of lever 38 acts through strap 88 to pivot movable contact 84 downwardly so as to open switch 70. The electrical circuit is thus interrupted and wasteful power consumption from power source 66 is prevented. Cessation of current flow permits coil 62 to cool, thus eliminating hazardous conditions of overheating in the valve structure. Moreover, the deactivation of the electric circuit obviates dangerous electric sparking in the wiring system. When the high temperature condition has been eliminated, the valve is opened and reset as described hereinabove.

To avoid resetting of the valve by unauthorized personnel, we form enclosure 35 with a cover plate 35a being suitably apertured to receive screws 90 that extend through the cover plate into threaded openings 92 inside the housing. The heads of screws 90 are formed with openings therein through which a wire or the like 94 can be threaded and sealed in a conventional manner. Thus access to the interior of enclosure 35 can not be had without disturbing wire 94 thereby discouraging unauthorized entry into the enclosure.

While one embodiment of this invention has been shown and described above, it will be apparent that other adaptations and modifications may be made without departing from the true spirit and scope of the invention.

We claim:

1. A valve for arresting the flow of flammable fluid in response to an increase in ambient temperature proximate the valve comprising a body defining a conduit for the fluid, a sealing member transversely slidable in said body relative said conduit between a fluid flow arresting position and a fluid flow passing position, means for biasing said sealing member toward the fluid flow arresting position, a rod affixed to said sealing member and extending exterior said body for operating said member, said rod having an aperture therein adjacent the end thereof extending exterior said body, a lever having one end adapted to be received in said aperture, a portion of said body adjacent said aperture forming a fulcrum for said lever, a fusible link for securing the opposite end of said lever in a position to hold said sealing member in a fluid flow passing position against said biasing means, the fulcrum forming portion of said body releasably receiving said lever and defining a pivotal support for said lever when said lever is received in said rod aperture and secured by said fusible link, said lever being adapted so that the distance from the fulcrum to the link exceeds the distance of the fulcrum to the rod aperture, said fusible link being exposed to ambient conditions proximate said body, so that upon a rise of ambient temperature said fusible link fuses to permit said biasing means to move said sealing member to the fluid flow arresting position.

2. The invention according to claim 1 wherein said fulcrum forming portion comprises a concavity, said lever having a protuberance extending into said concavity so as to permit said lever to fall clear of the rod aperture in said rod and the valve body when said link fuses.

3. The invention according to claim 1 in combination with an electrical resistance coil in heat energy communication with said link and in spaced-apart circumscribing relation to said link, a source of electric power for energizing said electrical resistance coil, means responsive to increased temperature for completing an electric path, and means connecting said electric path completing means, said coil and said power source in series, whereby an increase in temperature proximate said electric path completing means causes said coil to heat and fuse said link.

4. The invention according to claim 3 in combination with a normally closed switch in series with said resistance coil and means for opening said switch in response to movement of said sealing member toward the fluid flow arresting position.

5. In combination with a fluid valve of the type that is retained in an open position by a fusible link and is adapted to close when said link fuses, apparatus for controllably fusing the link in response to a temperature rise at a site remote from the valve comprising an electrical resistance coil in heat energy communication with said link and in spaced-apart circumscribing relation to said link, said spacing being sufficient to provide for free movement of said link therein, a source of electric power for energizing said electrical resistance coil, means responsive to increased temperature for completing an electric path, and means connecting said electric path completing means, said coil and said power source in series, whereby an increase in temperature proximate said electric path completing means causes said coil to heat and fuse said link.

6. The invention according to claim 5 in combination with a normally closed switch in series with said resistance coil and means for opening said switch in response to closure of the valve.

7. A valve for arresting the flow of flammable fluid in response to a dangerous increase in temperature proximate said valve or at least one of a plurality of sites remote from said valve comprising a body defining a conduit for the fluid, a sealing member transversely slidable in said body relative said conduit between a fluid flow arresting position and a fluid flow passing position, means for biasing said sealing member toward the fluid flow arresting position, a rod affixed to said sealing member and extending exterior said body for operating said member, a lever arm exterior said body for engaging said rod, a fusible link for supporting said lever arm in engagement with said rod to secure said sealing member against said biasing means in the fluid passing position, said fusible link being exposed to ambient conditions proximate said body, an electrical resistance coil circumscribing said link, a source of electric power for energizing said electrical resistance coil, a plurality of parallelly connected means responsive to increased temperature for completing an electric path, a normally closed switch in series with said resistance coil, means for opening said switch in response to movement of said sealing member toward the fluid flow arresting position and means connecting said parallelly connected electric path completing means, said coil, said switch, and said power source in series, whereby an increase in temperature proximate any individual said electric path completing means causes said coil to heat and fuse said link.

8. Apparatus according to claim 7 in combination with an enclosure for said rod, said lever, said link, said coil, said switch and said switch opening means, said enclosure being formed with a heat pervious portion adjacent said coil, and means for securing said enclosure against unauthorized entry.

References Cited by the Examiner

UNITED STATES PATENTS

| | | | |
|---|---|---|---|
| 725,728 | 4/1903 | Cowles | 137—76 X |
| 1,218,729 | 3/1917 | Weisgerber | 137—77 |
| 1,494,304 | 5/1924 | Grabowski | 137—76 |
| 1,683,523 | 9/1928 | Buckley | 137—77 |
| 2,326,050 | 8/1943 | Merdan | 137—76 X |
| 2,526,159 | 10/1950 | Rowley | 169—42 X |

WILLIAM F. O'DEA, *Primary Examiner.*

ISADOR WEIL, *Examiner.*

R. GERARD, *Assistant Examiner.*